United States Patent

Kurata

Patent Number: 5,479,549
Date of Patent: Dec. 26, 1995

[54] COUPLING STRUCTURE BETWEEN A SEMICONDUCTOR LASER AND AN OPTICAL FIBER AND COUPLING METHOD THEREOF

[75] Inventor: Kazuhiko Kurata, Tokyo, Japan

[73] Assignee: NEC Corporation, Tokyo, Japan

[21] Appl. No.: 394,161

[22] Filed: Feb. 22, 1995

[30] Foreign Application Priority Data

Feb. 23, 1994 [JP] Japan .................................. 6-024614

[51] Int. Cl.⁶ .................................................. G02B 6/36
[52] U.S. Cl. .................................................... 385/88
[58] Field of Search ........................... 385/88–94, 49, 385/147

[56] References Cited

U.S. PATENT DOCUMENTS

| | | | |
|---|---|---|---|
| 4,639,130 | 1/1987 | Koike et al. | 356/73.1 |
| 4,676,231 | 6/1987 | Hisazumi et al. | 128/6 |
| 4,786,132 | 11/1988 | Gordon | 385/37 |
| 4,966,429 | 10/1990 | Stephens et al. | 385/901 |

FOREIGN PATENT DOCUMENTS 61-221705  10/1986  Japan .
2-93414    4/1990  Japan .

*Primary Examiner*—Rodney B. Bovernick
*Assistant Examiner*—John Ngo
*Attorney, Agent, or Firm*—Sughrue, Mion, Zinn, Macpeak & Seas

[57] ABSTRACT

In a coupling structure for directly coupling a semiconductor laser to an optical fiber without using a lens, a coupling structure is provided which is superior in producibility, low in coupling loss and stable in operation of the semiconductor laser, by removing an influence of a return light due to Fresnel reflection from an end face of the optical fiber. A re-combination of the semiconductor laser to an active layer of the optical fiber is prevented by scattering a reflection light at the end face of the optical fiber by positively increasing a surface roughness Rz of the end face of the optical fiber to a range from 0.04 μm to 0.06 μm. The end face is formed by cutting the optical fiber with a blade saw having abrasive of particle size in a range from #1000 gauge to #2000 gauge corresponding to a range from 8 μm to 20 μm. The end face may be polished with abrasive having size in a rage from #1000 to #2000 gauge.

4 Claims, 2 Drawing Sheets

COUPLING STRUCTURE BETWEEN A SEMICONDUCTOR LASER AND AN OPTICAL FIBER AND COUPLING METHOD THEREOF

BACKGROUND OF THE INVENTION

The present invention relates to an optical coupling between a semiconductor laser and an optical fiber and, particularly, to a coupling structure for directly coupling a semiconductor laser and an optical fiber without using condenser means such as lens, etc., and a coupling method therefor.

One of methods for optically coupling an output light of a semiconductor laser to an optical fiber is to use an optical condenser means such as lens, etc., for condensing an output light of the laser and coupling it to the optical fiber. The other method is to place an end face of an optical fiber in close proximity to an output end face of a semiconductor laser to couple an output light of the laser directly to the optical fiber.

In either method, in order to reduce a coupling loss, the end face of the optical fiber is mirror-polished. This is because the coupling loss is considered as being increased by scattering if there is minute irregularity in the end face of the optical fiber (see, for example, Japanese Patent Application Laid-open No. S61-221705).

Since the direct coupling method mentioned above does not require any part such as lens and thus miniaturization and cost reduction are possible, realization of the latter method has been eagerly waited for these years. In the method for directly coupling a semiconductor laser to an optical fiber, however, a return light caused by Fresnel reflection at a mirror-polished end face of the optical fiber may be re-combined in an oscillator portion of the semiconductor laser, causing an oscillating state of the semiconductor laser to be unstable.

In general, in order to reduce an influence of reflection light from an end face of an optical fiber, the optical fiber and a semiconductor laser are arranged such that an optical axis of oscillation light from the semiconductor laser is not perpendicular to the end face of the optical fiber. This method is realized by tilting the optical fiber itself with respect to the semiconductor laser or polishing the end face of the optical fiber obliquely (see, for example, Japanese Patent Application Laid-open No. S58-132709). Another method for reducing the influence of reflection light is to provide an anti-reflection coating on the end face of the optical fiber (see, for example, Japanese Patent Application Laid-open No. H2-93414).

In the method in which the optical axis of the semiconductor laser is made oblique with respect to that of the optical fiber by polishing the end face of the optical fiber obliquely, it is difficult to precisely polish the end face at a predetermined angle. Particularly, in the method of directly coupling the semiconductor laser to the optical fiber, since the end face of the optical fiber must be polished in its filament state, the producibility thereof is low. In the method in which the optical fiber is tilted with respect to the semiconductor laser, a setting of an angle of tilting is difficult and further coupling loss is increased when the optical fiber and the laser are coupled.

On the other hand, in the method which uses the anti-reflection coating on the end face of the optical fiber, its producibility is very low since such coating is provided by attaching an anti-reflection film on the end face or vapor-depositing it thereon. In any of the conventional methods mentioned above, it is difficult to effectively remove the influence of reflection light from the end face of the optical fiber. For this reason, it is impossible, in the direct coupling method, to make the end face of the optical fiber sufficiently close to the oscillation face of the semiconductor laser. Since the coupling loss increases with increase of a distance between the end face of the optical fiber and the oscillation face of the semiconductor laser, there is another problem of coupling loss.

SUMMARY OF THE INVENTION:

An object of the present invention is to realize a low loss coupling structure of a semiconductor laser and an optical fiber by which an arrangement of the optical fiber in coupling it to the semiconductor laser is easy and a reproducibility thereof is improved by removing the necessity of providing an anti-reflection coating.

The coupling structure of the semiconductor laser and the optical fiber for optically coupling an output light of the semiconductor laser to the optical fiber by arranging the optical fiber in close proximity to an output face of the semiconductor laser and the coupling method thereof according to the present invention is featured by that surface roughness Rz of the end face of the optical fiber is not less than 0.04 μm and not more than 0.06 μm.

Particularly, the last step of formation of the end face of the optical fiber is to cut it with a blade saw with surfaces having abrasive particles of grain size not less than 8 μm and not more than 20 μm. Alternatively, the last step of end face formation is to polish it by using abrasive particles having grain size not less than 8 μm and not more than 20 μm. The abrasive may be diamond particles.

In the case where the optical fiber is cut by the blade saw, the blade saw may be rotated at a speed not lower than 10,000 rpm and not higher than 30,000 rpm. A moving speed of the blade saw in cutting the optical fiber is not lower than 0.03 mm/sec and not high than 0.07 mm/sec.

In the coupling structure of the semiconductor laser and the optical fiber, according to the present invention, when applied to the direct coupling, the end face of the optical fiber is not mirror-finished and has a constant irregularity. With such irregularity, Fresnel reflection light is scattered when it is reflected. Therefore, there is no light returned to an oscillator portion of the semiconductor laser and the influence of return light is removed. On the other hand, by limiting the surface roughness of the end face of the optical fiber due to the irregularity thereof to a value not more than a wavelength of the laser light, a spot size distortion of light to be coupled to the optical fiber is small. Therefore, the irregularity of the end face of the optical fiber does not lead to increase of coupling loss and so it is possible to obtain a coupling with substantially the same efficiency as that obtainable with the mirror-polished end face.

In the conventional direct coupling structure, it is difficult to make the distance between the end faces of the optical fiber and the semiconductor laser as close as 50 μm or less. According to the present invention, the influence of return light is removed even if the distance is smaller than 50 μm and, therefore, the operation of the semiconductor laser becomes stable and the coupling loss can be reduced.

BRIEF DESCRIPTION OF THE DRAWINGS

The above mentioned and other objects, features and advantages of the present invention will becomes more apparent from the following detailed description when taken in conjunction with the accompanying drawings, wherein.

DETAILED DESCRIPTION OF THE PREFERRED EMBODIMENTS

The present invention will be described in detail with reference to the drawings.

Figure 1:
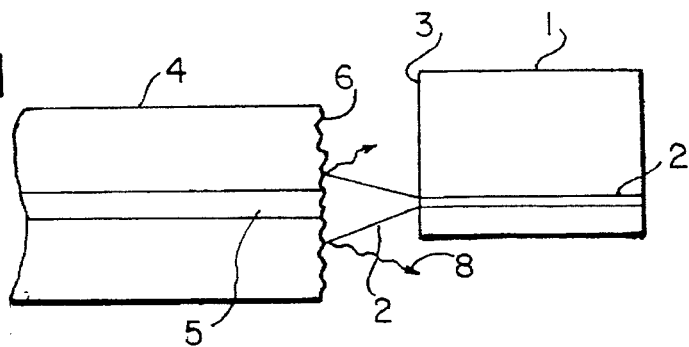
FIG. 1 shows a coupling structure of a semiconductor laser and an optical fiber, according to the present invention.

FIG. 1 is a longitudinal cross section of a coupling structure of a semiconductor laser and an optical fiber, according to the present invention. Similarly to the conventional coupling structure, an output light 2 of the semiconductor laser 1 is directly coupled to a core 5 of the optical fiber 4 by arranging an end face 6 of the optical fiber 4 in close proximity to an end face 3 of the semiconductor laser 1. In this embodiment, the semiconductor laser 1 emits light having wavelength of 1.3 μm with emitting angle of 32 degree. Further, the optical fiber used is of a single mode quartz fiber having core diameter of 10 μm.

The end face 6 of the optical fiber 1 used in the present invention has an average surface roughness Rz in a range from 0.04 μm to 0.06 μm. Incidentally, surface roughness Rz of the conventional mirror-polished end face is in the order of 0.01 μm. Therefore, the surface roughness of the end face in the present invention is larger than that of the mirror-finished end face. Further, the surface roughness of the end face of the present invention is smaller than the wavelength of 1.3 μm of the laser light.

Figure 2:
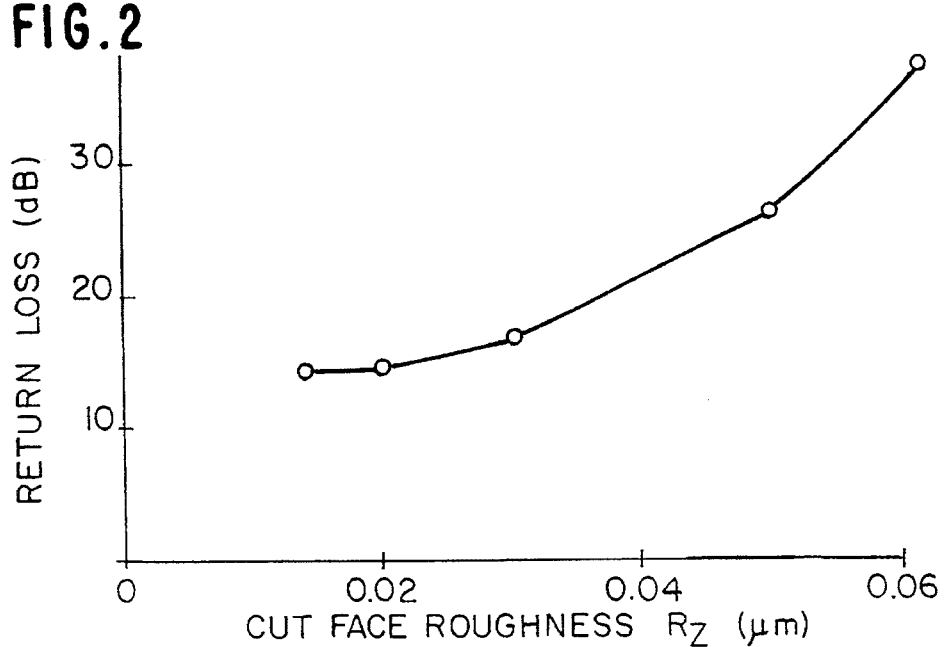
FIG. 2 shows a relation between surface roughness of an end face of an optical fiber and a return loss.

FIG. 2 is a graph showing a relation between surface roughness of the end face of an optical fiber and return loss. The return loss was measured while changing surface roughness of the end face of the optical fiber which is arranged in a facing relation to an end face of another optical fiber with a gap of about 10 μm to receive light emitted from the end face of the another optical fiber. In this case, in order to minimize Fresnel reflection light from the end face of the light receiving optical fiber, an anti-reflection film having attenuation of about 30 dB is provided thereon directly.

It is clear from FIG. 2 that, when the end face of the light receiving optical fiber is mirror-finished, that is, when its surface roughness Rz is in the order of 0.01 μm, a reflection light of about 15 dB is re-combined to the light emitting optical fiber, that, when the surface roughness Rz is increased to about 0.05 μm, the amount of re-combined light is decreased gradually to about 26 dB and that, when the surface roughness Rz becomes about 0.06 μm, it is attenuated to 35 dB or less.

The optical fiber having the end face whose surface roughness is mentioned above can be formed by a polishing method or a blade saw cutting method, which are to be described. In either method, the abrasive material and the polishing or cutting condition are important factors in obtaining the above mentioned surface roughness. Although diamond is most suitable as the abrasive material, it may be other hard material such as ruby. In addition to the abrasive material, the particle size of it is also very important in determining the surface roughness of the end face of the optical fiber. The forming conditions for obtaining a desired surface roughness of the end face of the optical fiber will be described in detail for each method.

First, the polishing method using abrasive particles having a specific grain size will be described. In the usual forming of the end face, it is polished with abrasive material of large gauge number, that is, large particle size, and then with abrasive material of smaller particle sizes in succession. Thereafter, in order to obtain a mirror surface, it is buffed up finally. The surface roughness Rz of the buffed end face is about 0.01 μm. The surface roughness Rz of the end face when polished with the abrasive material of #6000 gauge (particle size is 8 μm or less) in a step immediately before the buffing step is about 0.02 μm. In order to obtain the previously mentioned surface roughness of about 0.05 μm, the particle size of abrasive material may be selected in a range from #1000 to #2000 (particle size from 8 to 20 μm). According to a result of experiments conducted by the inventors of this invention, the end face can be finished with surface roughness Rz=0.06 μm with abrasive of #1000 gauge (particle size of about 20 μm) and with surface roughness Rz=0.04 μm with abrasive of #2000 gauge (particle size of about 8 μm). Further, when the final polishing is performed with abrasive of #500 gauge (particle size of 20 μm or more), the surface roughness Rz becomes about 0.1 μm which is too rough. Therefore, according to the present method, it is possible to easily form an end face of an optical fiber having surface roughness necessary to obtain the coupling structure of the present invention by only suitably selecting the gauge of the abrasive to be used in the final polishing step.

On the other hand, in the blade saw cutting method, a blade saw having a specific abrasive size is used. The specific abrasive size in this method is in a range from #1000 gauge to #2000 gauge. When an optical fiber is cut by the blade saw having the abrasive gauge mentioned above, it is possible to obtain an end face having surface roughness similar to that of the end face obtained by the polishing method. In this embodiment, the blade saw having abrasive of #1200 gauge (particle size of about 10 μm) is used under the cutting condition of 15,000 rpm. When the rotation speed of the blade saw is in a range from 10,000 rpm to 30,000 rpm, dependency of a resultant surface roughness on the rotation speed is small and it is possible to obtain the above mentioned surface roughness. According to this method, the final step is completed by only the cutting unlike the polishing method and, therefore, its mass producibility is superior.

Figure 3:
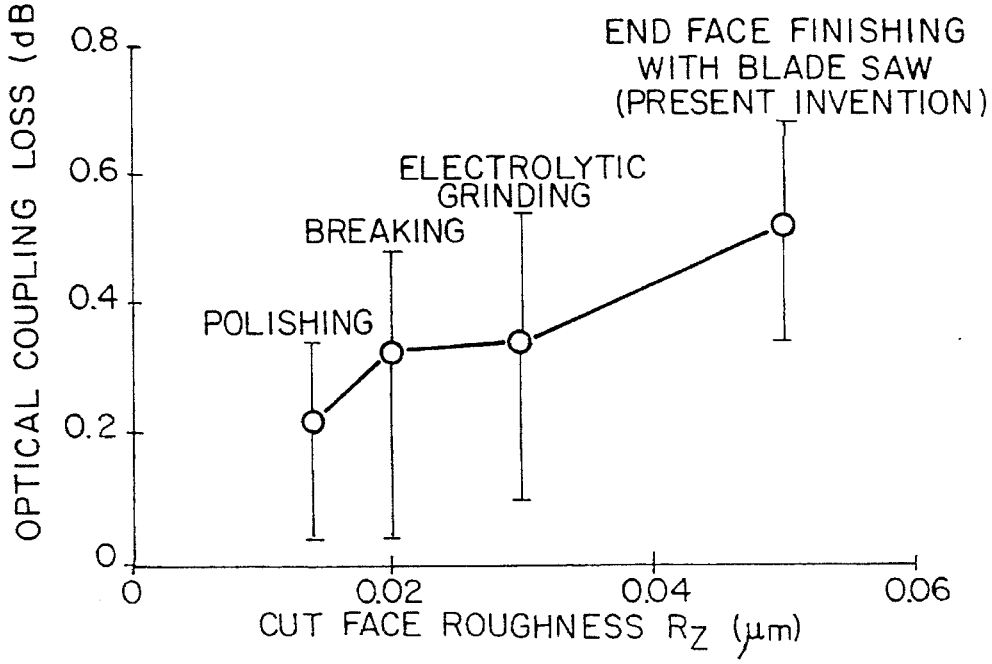
FIG. 3 shows a relation between surface roughness of an end face of an optical fiber and insertion loss.

As mentioned previously, when the surface roughness is increased, the influence of scattering becomes large and loss of light re-combined to the light receiving optical fiber is increased. FIG. 3 shows a relation between the surface roughness of an end face of an optical fiber which is finished by various methods and a result of measurement of insertion loss between two optical fibers having end faces opposing to each other by means of a similar measuring system to that used in the measurement of the return loss. As shown, the surface roughness Rz of the end face of the optical fiber which is finished by the blade saw is 0.05 μm which is more rough than the end face finished by polishing. However, a difference in insertion loss between them is only about 0.02 dB which is in a tolerable range.

Therefore, considering both the insertion loss and the return loss, it is clear that it is optimal to form the end face of the optical fiber with surface roughness Rz thereof being in a range from 0.04 μm to 0.06 μpm, within which it is possible to obtain return loss of about 20 dB or more. In this case, the coupling loss is about 0.5 dB and so it can be applied to the coupling between the semiconductor laser and the optical fiber with satisfactory characteristics. Although the case where the blade saw is used was described, it is possible to obtain a similar surface roughness and measuring result by means of polishing, provided that the abrasive used in the final finishing step is within a range from #1000 gauge to #2000 gauge.

Figure 4:
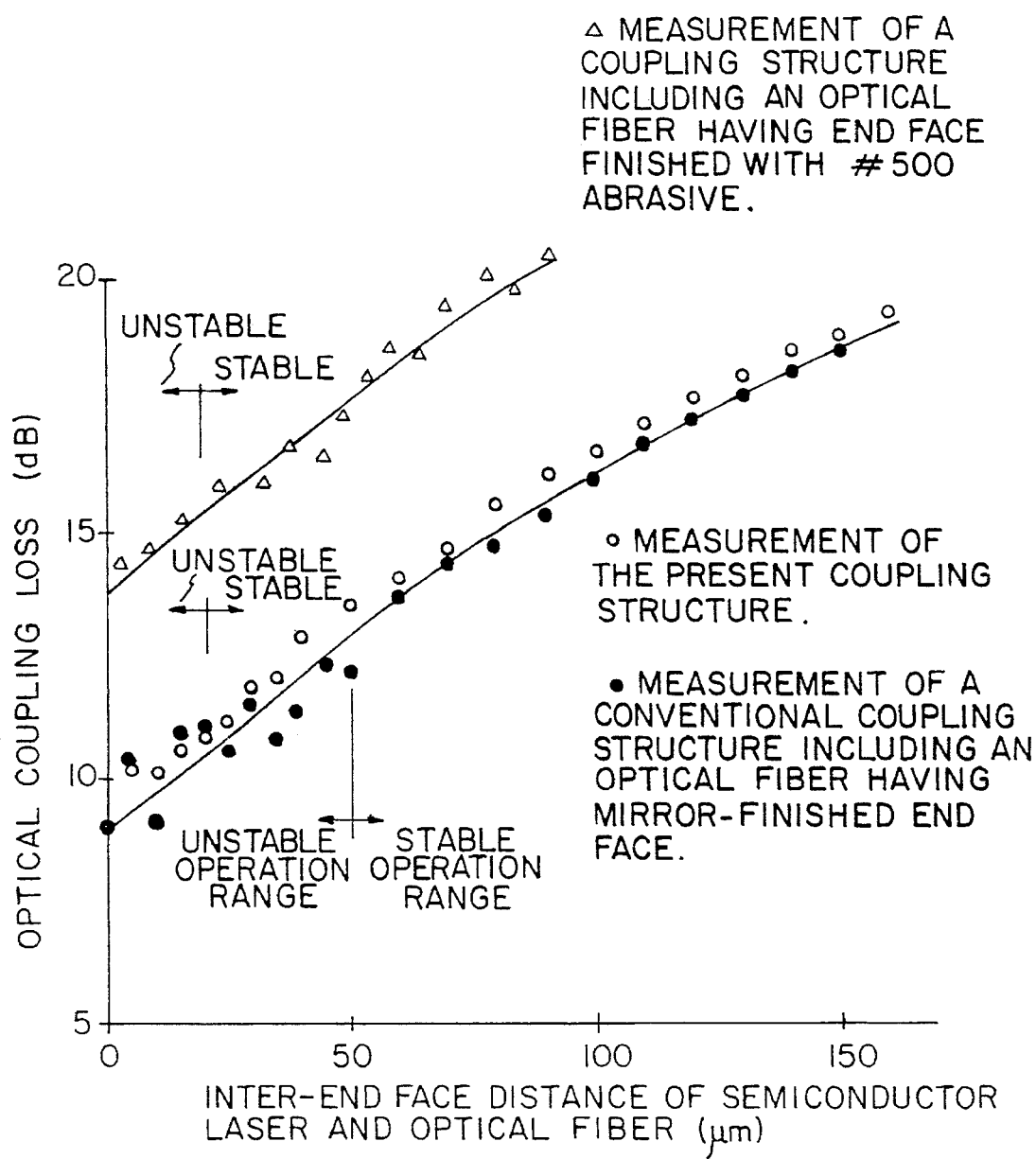
FIG. 4 shows a relation between a distance between end faces of a semiconductor laser and an optical fiber and coupling loss, when surface roughness of the end face of the optical fiber is changed.

Now, characteristics evaluation of a practical coupling between the semiconductor laser and the optical fiber will be described with reference to FIG. 4. FIG. 4 shows a relation between coupling loss and distance between an end face of an optical fiber which has a surface roughness obtained by finishing it with using the above mentioned method and a semiconductor laser, together with relations between them obtained when the end face of the optical fiber is mirror-polished and when the surface roughness thereof is increased by using larger abrasive particles.

Comparing the coupling loss (indicated by ○ in FIG. 4) of the present coupling structure with the coupling loss (indicated by ● in FIG. 4) of the conventional coupling structure, it is clear that a difference therebetween is only about 0.3 dB for identical distance and the relations between the distance between end faces and the coupling loss of them are similar. When the surface roughness of the end face of the optical fiber becomes large, the conventional coupling structure using the condenser lens may be influenced by scattering and its coupling loss may be lowered. However, in the direct coupling structure, the coupling loss is not lowered if the surface roughness of the end face is within this range which is smaller than the wavelength of laser light. The reason for this fact may be for that distortion of spot size of light coupled to the core of the optical fiber is small and thus a power distribution of light directed to the optical fiber is not disturbed.

On the other hand, when the surface roughness is made larger than that of the present structure by using abrasive of about #500 gauge, the coupling loss (indicated by Δ in FIG. 4) is increased by about 5 dB. The reason for this fact may be for that the surface roughness in this range is largely influenced by scattering, so that a portion of light from the semiconductor laser which corresponds to a position of the core of the optical fiber is directed to the optical fiber at an incident angle larger than NA of the optical fiber and is not coupled to the optical fiber.

Describing the distance between the end faces of the semiconductor laser and the optical fiber and the stability of operation of the semiconductor laser with reference to FIG. 4, there is no substantial difference in coupling loss between the conventional coupling structure and the coupling structure of the present invention. However, when the distance is gradually decreased in the conventional coupling structure to about 50 μm, the operation of the semiconductor laser becomes unstable. This fact can be recognized by a considerable change of coupling loss measured in the coupling loss measurement and also by a practical optical modulation characteristics. In the coupling structure according to the present invention, however, the operation of the semiconductor laser is stable even if the distance is decreased to about 20 μm. Assuming that the distance in both coupling structures is identical, the coupling loss of the present coupling structure is larger than that of the conventional coupling structure by about 0.3 dB. In the coupling structure of the present invention, however, it is clear that the coupling loss can be improved by about 0.5 dB compared with the conventional coupling structure with distance of 50 μm, when the distance is decreased to about 30 μm.

The re-combination of light to the active layer of the optical fiber can be avoided by scattering Fresnel reflection light at the end face of the optical fiber by the use of the optical fiber having the end face which is positively roughed in the range shorter than the wavelength of laser light, and, thus, it is possible to make the operation of the semiconductor laser stable without reducing the coupling loss.

As described hereinbefore, according to the present invention, the coupling structure between the semiconductor laser and the optical fiber which is very simple in construction, has low coupling loss and is not substantially influenced by return light can be realized. Thus, the present invention is effective to improve the performance and producibility of the coupling structure and to reduce the fabrication cost thereof.

What is claimed is:

1. A coupling structure for coupling a semiconductor laser to an optical fiber, comprising:

said semiconductor laser; and said optical fiber having an end face having surface roughness Rz in a range from 0.04 μm to 0.06 μm and arranged in close proximity to an output plane of said semiconductor laser to be coupled optically to an output laser light of said semiconductor laser.

2. The coupling structure for coupling a semiconductor laser to an optical fiber, claimed in claim 1, wherein a distance of said output plane of said semiconductor laser and said end face of said optical fiber is 50 μm or less.

3. The coupling structure for coupling a semiconductor laser to an optical fiber, claimed in claim 1, wherein said end face of said optical fiber is formed by cutting said optical fiber by a blade saw having abrasive particles of grain size in a range from 8 μm to 20 μm.

4. The coupling structure for coupling a semiconductor laser to an optical fiber, claimed in claim 1, wherein said end face of said optical fiber is formed by finally polishing said end face with abrasive particles of grain size in a range from 8 μm to 20 μm.

* * * * *